(12) United States Patent
Shirai

(10) Patent No.: US 8,228,552 B2
(45) Date of Patent: Jul. 24, 2012

(54) IMAGE RECORDING DEVICE

(75) Inventor: Takaaki Shirai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1728 days.

(21) Appl. No.: 11/513,217

(22) Filed: Aug. 31, 2006

(65) Prior Publication Data

US 2007/0052981 A1    Mar. 8, 2007

(30) Foreign Application Priority Data

Aug. 31, 2005   (JP) ................................. 2005-250863

(51) Int. Cl.
*G06F 15/00*    (2006.01)
(52) U.S. Cl. ........................................................ 358/1.2
(58) Field of Classification Search .................... 358/1.2
See application file for complete search history.

(56) References Cited

U.S. PATENT DOCUMENTS 6,172,765 B1 *   1/2001   Kawamoto ..................... 358/1.2

FOREIGN PATENT DOCUMENTS

| JP | 5-270055 A | 10/1993 |
|---|---|---|
| JP | 2000-059613 A | 2/2000 |
| JP | 2001-069326 A | 3/2001 |
| JP | 2003-046763 A | 2/2003 |
| JP | 2003-063077 A | 3/2003 |
| JP | 2003-141023 A | 5/2003 |
| JP | 2003-264656 A | 9/2003 |
| JP | 2004-056406 A | 2/2004 |
| JP | 2005-221634 A | 8/2005 |

OTHER PUBLICATIONS

JP Office Action dtd Apr. 7, 2010, JP Appln. 2005-250863, English Translation.

* cited by examiner

Primary Examiner — Saeid Ebrahimi Dehkordy
(74) Attorney, Agent, or Firm — Banner & Witcoff, Ltd.

(57) ABSTRACT

There is provided an image recording device that comprises an output buffer configured to temporarily store image data for one page of a recording medium, an image generating unit configured to generate output image data based on input image data, and an image recording unit configured to record an image on a recording medium. The image generating unit includes a buffer based scale factor determining unit configured to determine a buffer based scale factor, the buffer based scale factor being determined such that an amount of the output image data does not exceed a capacity of the output buffer, a scale factor determining unit configured to determine a scale factor by which the image represented by the input image data is enlarged or reduced, and an image enlarging/reducing unit that generates the output image data based on the scale factor determined by the scale factor determining unit.

12 Claims, 10 Drawing Sheets

IMAGE RECORDING DEVICE

CROSS-REFERENCE TO RELATED APPLICATION

This application claims priority under 35 U.S.C. §119 from Japanese Patent Application No. 2005-250863, filed on Aug. 31, 2005. The entire subject matter of the application is incorporated herein by reference.

BACKGROUND OF THE INVENTION

1. Technical Field

The present invention relates to an image recording device.

2. Related Art

Conventionally, a device which supports a plurality of functions such as a printer function, a scanner function, a copy function and a facsimile function integrally is provided in practical use. Such a device that supports a plurality of functions is generally called a multi function device (MFD).

A page printer (a laser printer) which prints image data of each page stored in an output buffer memory on a print paper at a time is becoming a mainstream type of a printer. However, in such a printer, in a case where an image is enlarged or reduced to be recorded on a print paper, data amount of enlarge or reduced image data may exceed a storage capacity of the output buffer and lack of a part of the image may happen or the image may be divided into a plurality of pages. As a result, there may be a problem that it is hard for a user to grasp the whole image.

SUMMARY OF THE INVENTION

Aspects of the invention are advantageous in that there is provided an image recording device which is capable of recording an enlarged or reduced image without lacking a part of the image nor dividing the image into a plurality of pages.

DESCRIPTION

General Overview

Figure 1:
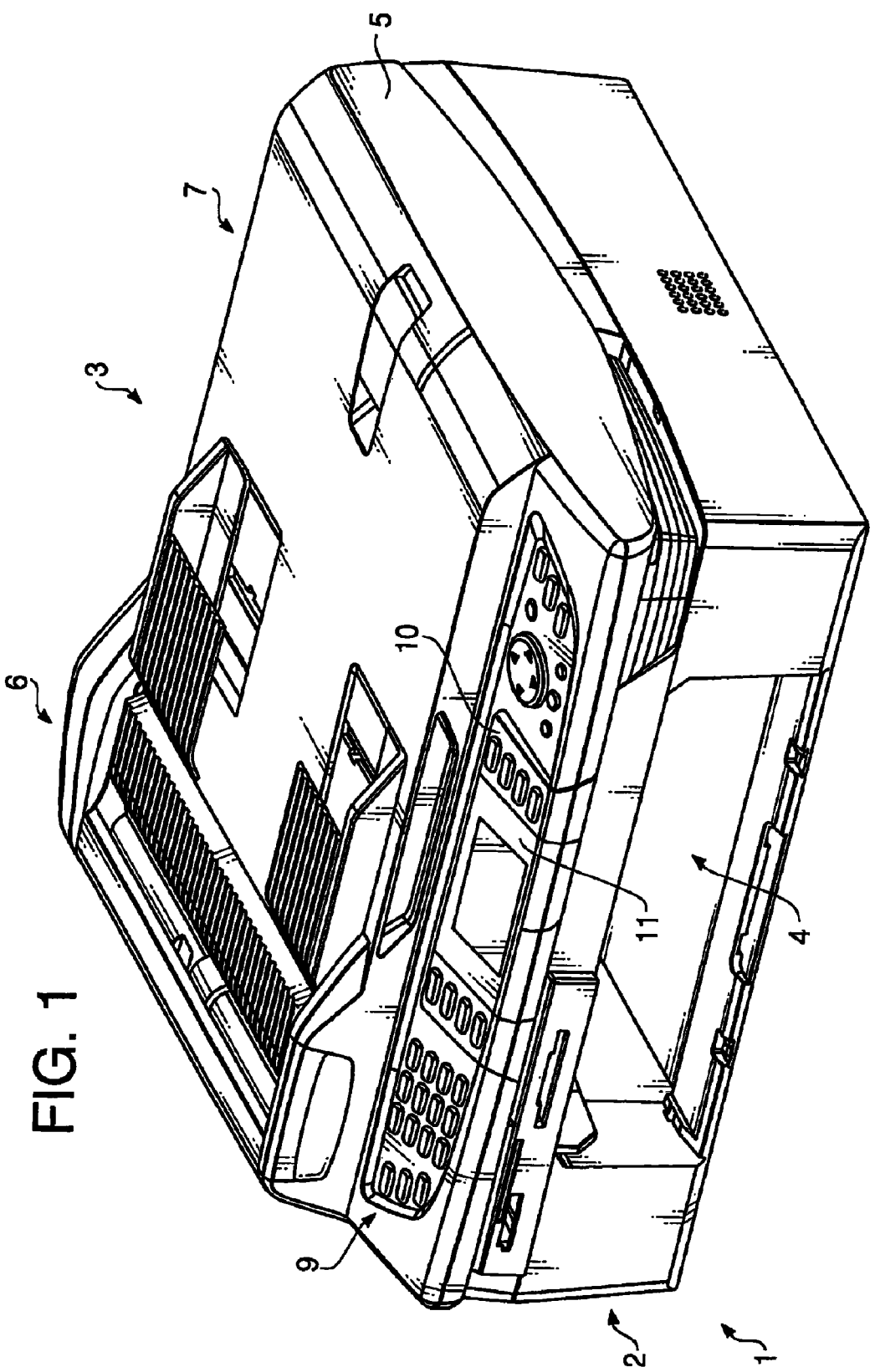
FIG. 1 is a perspective view which shows an appearance of a multi function device as an embodiment according to aspects of the present invention.

According to aspects of the invention, there is provided an image recording device that comprises an output buffer configured to temporarily store image data for one page of a recording medium, an image generating unit configured to generate output image data based on input image data, the output image data representing an enlarged or reduced version of an image represented by the input image, and an image recording unit configured to record an image on a recording medium in accordance with the image data stored in the output buffer. The image generating unit includes a buffer based scale factor determining unit configured to determine a buffer based scale factor, the buffer based scale factor being determined such that an amount of the output image data which represents the enlarged or reduced image does not exceed a capacity of the output buffer in the case that the image represented by the input image data is enlarged or reduced by the buffer based scale factor, a scale factor determining unit configured to determine a scale factor by which the image represented by the input image data is enlarged or reduced, the scale factor being determined to be less than or equal to the buffer based scale factor, and an image enlarging/reducing unit that generates the output image data based on the scale factor determined by the scale factor determining unit.

The buffer based scale factor is determined in the range where data amount of the enlarge or reduced output image data does not exceed the memory capacity of the output buffer from the input image data, and using the buffer based scale factor as a setup scale factor, the enlarged or reduced output image data is obtained. In this way, it can be avoided the situation where lack of a part of the image may happen or the image may be divided into a plurality of pages due to the output image data excess over the memory capacity of the output buffer. At the same time, the image as large as possible can be stored in the recording medium. Therefore, images can be enlarged or reduced effectively using the output buffer. Here, enlargement and reduction of image in the present invention mean enlargement and reduction maintaining an aspect ratio.

Optionally, the image generating unit may be configured to have a first directional scale factor determining unit that calculate a first directional scale factor where a size of the enlarged or reduced output image data from the input image data stays within a width in a first direction of a recordable area in the recording medium, a second directional scale factor determining unit that determines a second directional scale factor where a size of the enlarged or reduced output image data stays within a width in a second direction which is orthogonal to the first direction of the recordable area, and a scale factor comparing unit that sets up the smallest scale factor among the buffer based scale factor, the first directional scale factor and the second directional scale factor as a scale factor which is applied to.

By using the smallest scale factor among the buffer based scale factor, the first directional scale factor where the size of the enlarged or reduced output image data stays within the width in the first direction of the recordable area in the recording medium, and the second directional scale factor where the size of the enlarged or reduced output image data stays within the width in a second direction as a scale factor which is applied, a scale factor where the memory capacity of the output buffer does not overflow and the image as large as possible can be printed in the recordable area is accordingly set up. Then, the enlarged or reduced output image data using the scale factor is recorded on the record medium.

Optionally, the image generating unit may be configured to have a scale factor comparing unit that sets up a smaller scale factor between the buffer based scale factor and a predetermined scale factor as a scale factor which is applied. For example, the predetermined scale factor may be set up where the enlarged image can provide the good printing result or desired processing speed. Then, this can prevent the image from being enlarged too much for printing.

The above described configures can be combined. It can be configured that the smallest scale factor is adopted among the buffer based scale factor, the first directional scale factor, the second directional scale factor and the predetermined scale factor.

According to aspects of the invention, there is provided an image recording device that includes an image generating unit that generates output image data for image recording from input image data, an output buffer that stores the output image data corresponding to one page amount, and an image recording unit that records the image in record medium based on the output image data stored in the output buffer. The image generating unit comprises a buffer based scale factor determining unit that determines a buffer based scale factor where data amount of the output enlarged or reduced image data from the input image data stays within memory capacity of the output buffer, a first directional scale factor determining unit that determines a first directional scale factor where a size of the enlarged or reduced output image data stays within a width in a first direction of a recordable area in the recording medium from the input image data, a second directional scale factor determining unit that determines a second directional scale factor where a size of the enlarged or reduced output image data stays within a width in a second direction which is orthogonal to the first direction of the recordable area, and a scale factor comparing unit that sets up the smallest scale factor among the buffer based scale factor, the first directional scale factor and the second directional scale factor as a scale factor which is applied to, an image enlarging/reducing unit that generates the output image data enlarged or reduced by the setup scale factor.

Optionally, the image recording device may be configured to have a communication unit that receives image data via a communication network and a storage unit that stores the received image data wherein the image generating unit reads out the image data from the storage unit as the input image data and generates the output image data. In devices that receive image data and record the data such as a facsimile function and a mail receiving function, the image as large as possible can be stored in the recording medium. Therefore, images can be enlarged or reduced effectively using the output buffer.

Optionally, the image recording device may be configured to have a communication unit that receives an electronic mail from a mail server via a communication network and a storage unit that stores the received electronic mail. The image generating unit reads out image data attached to the electronic mail from the storage unit as the input image data and generates the output image data. The configuration realizes a mail receiving function which is described later.

Embodiments

Hereinafter, embodiments according to the invention will be described with reference to the accompanying drawings.

(1) Configuration of Multi Function Device

Figure 2:
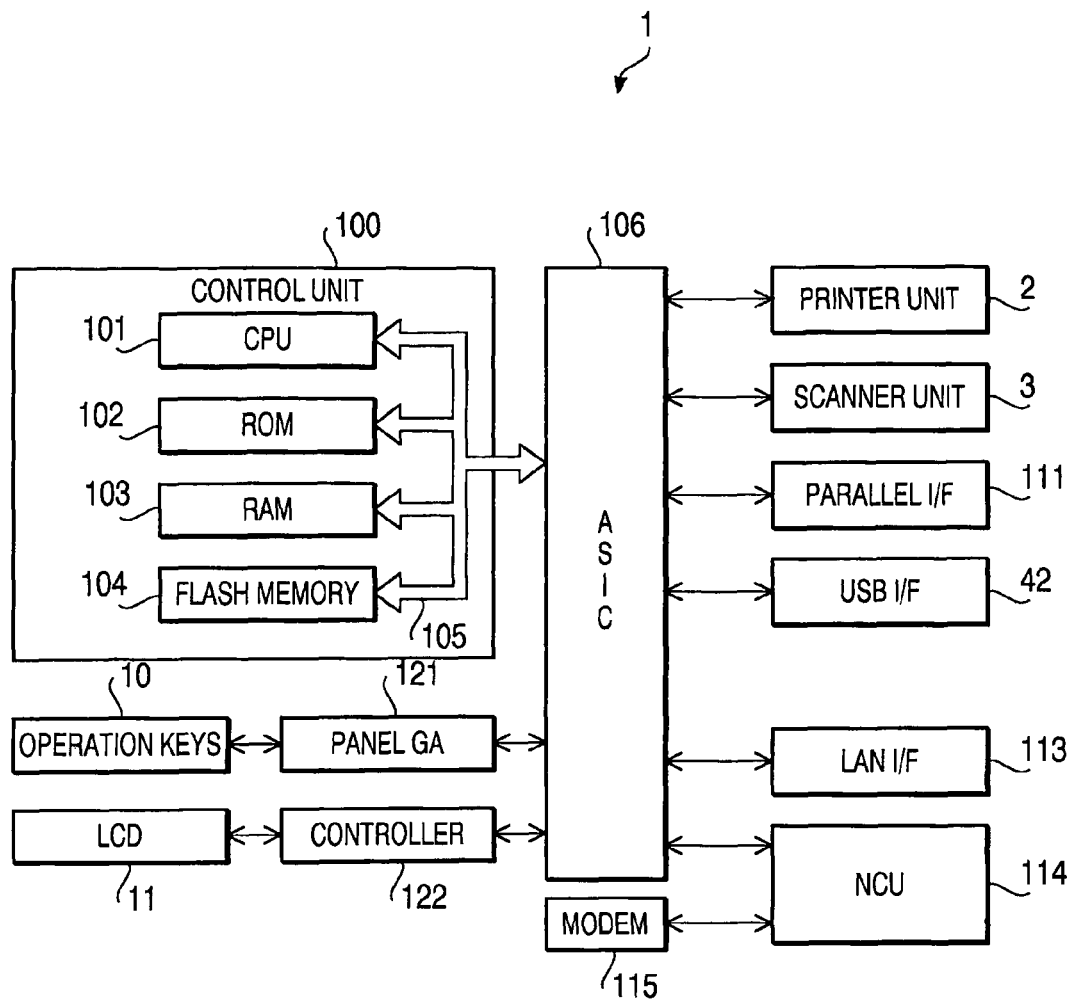
FIG. 2 is a block diagram which shows an electronic configuration of the multi function device of FIG. 1.

FIG. 1 is a perspective view which shows appearance of the multi function device 1 as an embodiment according to aspects of the present invention. The multi function device 1 includes a scanner unit 3 in an upper body portion, a printer unit (image recording unit) 2 in a lower body portion integrally, and has a printer function, a scanner function, a copy function, a facsimile function and a mail receiving function. FIG. 2 is a block diagram showing an electronic configuration of the multi function device 1. A control unit 100 which controls operations of the multi function device 1, the printer unit 2 which realizes the printer function and the scanner unit 3 which realizes the scanner function, etc. are connected to an ASIC (Application Specific Integrated Circuit) 106.

(1-1) Printer Unit

A configuration of the printer unit 2 is described. As can be seen in FIG. 1, an opening 4 is formed on the front side of the multi function device 1. A paper feed tray and a paper ejection tray (not shown) are to be attached to the opening 4. In the paper feed tray, print papers of A4 size, B5 size, etc. (recording medium) are kept. Inside of the printer unit 2, there are installed a paper feed roller, a paper transfer roller and a paper ejection roller on a feed path of print papers. Print papers carried out from the recording paper tray are guided through the transport track to a print position, and after printing, they are ejected to the paper ejection tray.

Figure 3:
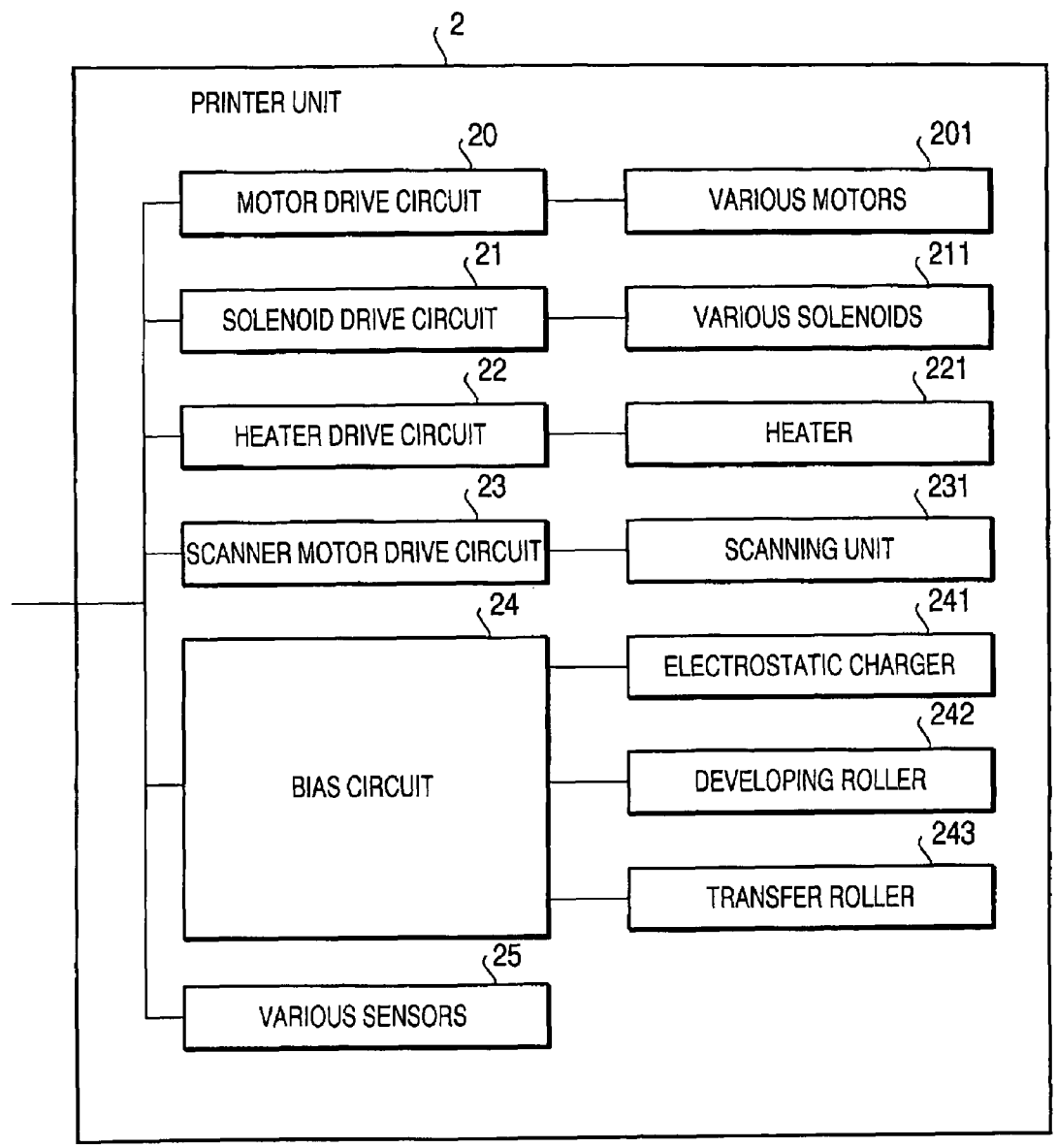
FIG. 3 shows details of a printer unit in FIG. 2.

The printer unit 2 is configured as a laser printer which is a page printer and prints on a page-by-page basis. FIG. 3 shows a block diagram of the printer unit 2. The printer unit 2 includes motors 201 for rotating a photosensitive drum and various rollers (a paper feed roller, a conveying roller, a paper ejection roller, etc.) and a motor drive circuit 20 to drive the motors 201, solenoids 211 for controlling transmission of drive force of the motors 201 to the rollers and a solenoid drive circuit 21 for driving the solenoid 211, a heater 221 for fusing and heater drive circuitry 22 for driving a heater 221, a scanning unit 231 for exposing the photosensitive drum and a scanner motor drive circuit 23 to drive the scanning unit 231. The ASIC 106 outputs signals to operate the drive circuits. The printer unit 2 also includes a bias circuit 24. The bias circuit 24 applies bias voltages to an electrostatic charger 241 to uniformly electrify the photosensitive drum, a developing roller 242 which attaches toner to an electrostatic latent image on the photosensitive drum, and a transfer roller 243 which transfers the toner image to print papers. The bias circuit 24 applies different bias voltages corresponding to the electrostatic charger 241, the developing roller 242 and the transfer roller 243. The printer unit 2 comprises a sensor 25 such as a detecting sensor to detect a print paper's presence. The printer unit 2 creates an electrostatic latent image based on image data (output image data) of each page stored in the output buffer 103A which will be described later, attaches toner to the electrified portion of the photosensitive drum which corresponds to the image, transfers the image to print papers, and fuses the image by heating. Thus the printer unit 2 can print the image.

(1-2) Scanner Unit

A configuration of the scanner unit 3 is described. As shown in FIG. 1, the scanner unit 3 includes an original document table 5 which functions as an FBS (Flatbed Scanner) and a document cover is attached to the original document table 5 such that the cover can be opened and closed freely. A platen glass to place an original copy is installed on the upper surface of the original document table 5 (not shown). The platen glass is also a reading surface when the ADF 6 is used to scan images. Inside the original document table 5, there is provided an image reading unit (not shown) having a contact image sensor. The unit scans the original copy along the platen glass, and, thus, the FBS reads images on the original copy.

(1-3) Communication Unit

As can be seen in FIG. 2, the multi function device 1 comprises a parallel interface 111 which transmits and receives data to and from a computer via a parallel cable, and a USB Interface 12 which transmits and receives data to and from a computer via a USB cable. The multi function device 1 also includes a LAN (Local Area Network) interface 113

(communication unit) which is transmitting and receiving data to and from computers connected to the LAN. This enables the multi function device 1 to communicate with a mail server on the LAN or the Internet, and realizes a mail receiving function described later. Further, the multi function device 1 includes an NCU (Network Control Unit) 114 and a MODEM 115 for realizing a facsimile function.

(1-4) Operation Panel

The multi function device 1 includes an operation panel 9 which is formed on the front side of the original document table 5, as can be seen in FIG. 1. The operation panel 9 has various operation keys 10 and a display unit 11. A user inputs desired commands using the operation panel 9. The multi function device 1 receives input commands and executes prescribed operations corresponding to the received input commands. As shown in FIG. 2, the operation keys 10 are connected to the ASIC 106 via a panel gate array 121 which detects pressing of one of the operation keys 10 and outputs a prescribed code signal. A liquid crystal display unit 11 is connected to the ASIC 106 via a LCD controller 122 which controls screen displays.

(1-5) Control Unit

Figure 4:
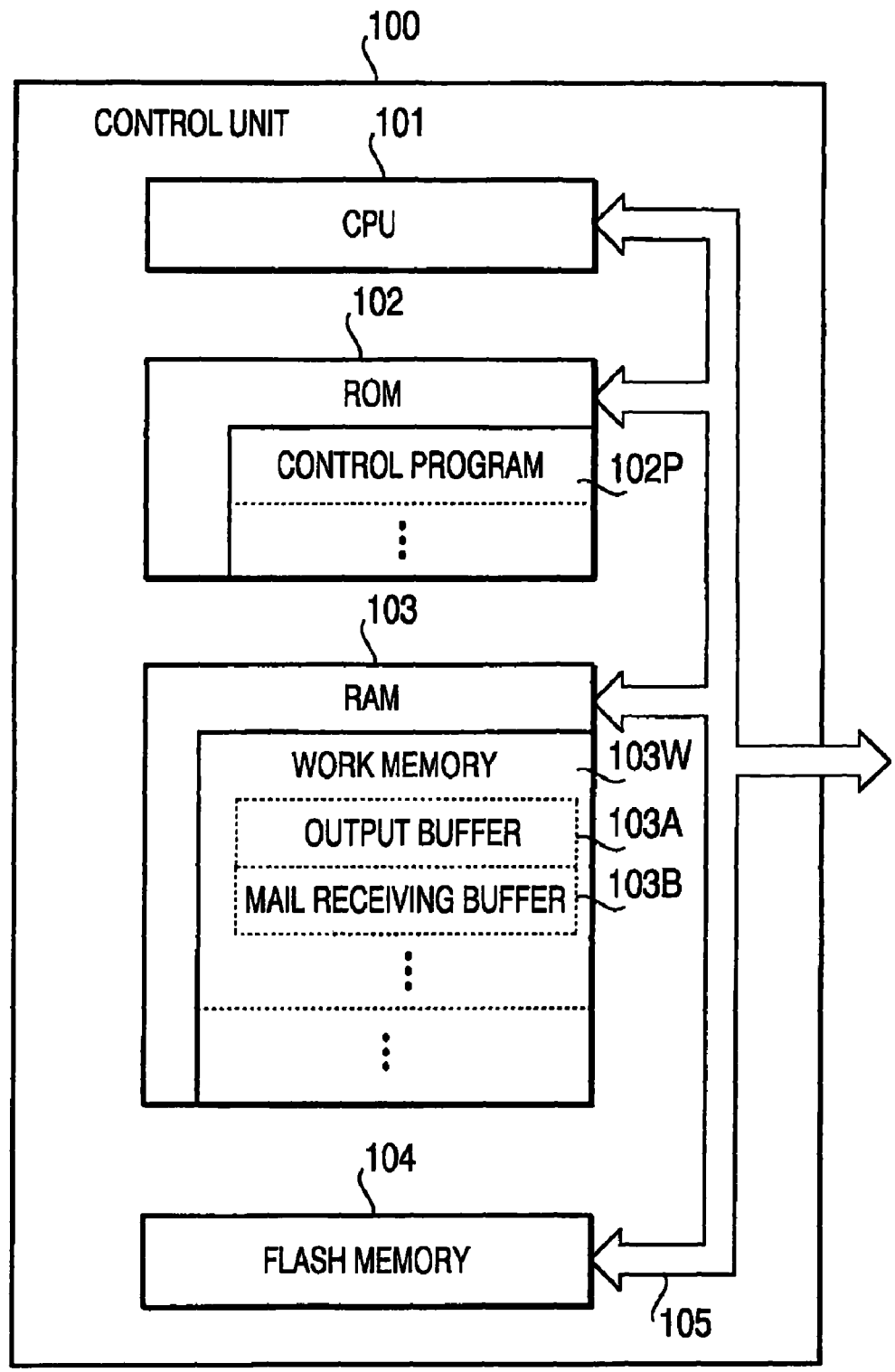
FIG. 4 shows details of a control unit in FIG. 2.

A configuration of the control unit 100 is described. FIG. 4 shows a block diagram of the control unit 100. The control unit 100 controls operations of the printer unit 2, the scanner unit 3, etc. of the multi function device 1. As can be seen in FIG. 4, the control unit 100 is configured as a micro computer including a CPU (Central Processing Unit) 101, a ROM (Read Only Memory) 102, a RAM (Random Access Memory) 103 and flash memory (Flash Memory) 104. The control unit 100 is connected to the ASIC 106 via a bus 105. A control program 102P to control various operations of the multi function device 1 is stored in the ROM 102. A work memory 103W is formed in the RAM 103 as a work area, when the CPU 101 executes the control program 102P.

An output buffer 103A is formed in the RAM 103 which temporarily stores output image data corresponding to one page amount, when the printer unit 2 is configured as a laser printer. A mail receiving buffer 103B (storage unit) which stores received electronic mails temporarily is also formed in the RAM 103 in an electronic mail receiving process which is described later (see S13 in FIG. 5).

(2) Operation of the Multi Function Device

Figure 8:
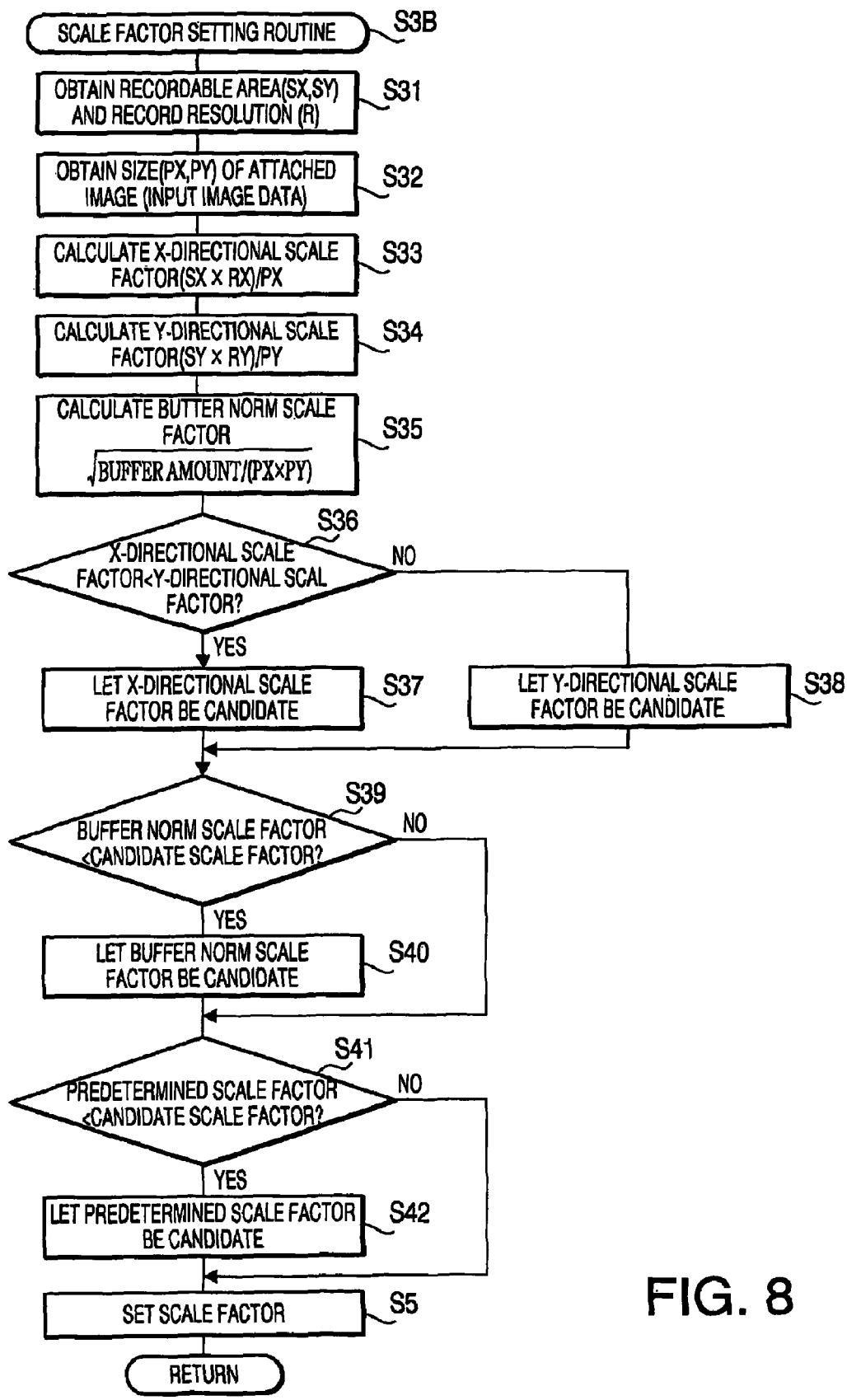
FIG. 8 shows a flowchart of a second example of a scale factor setup routine.
Figure 9:
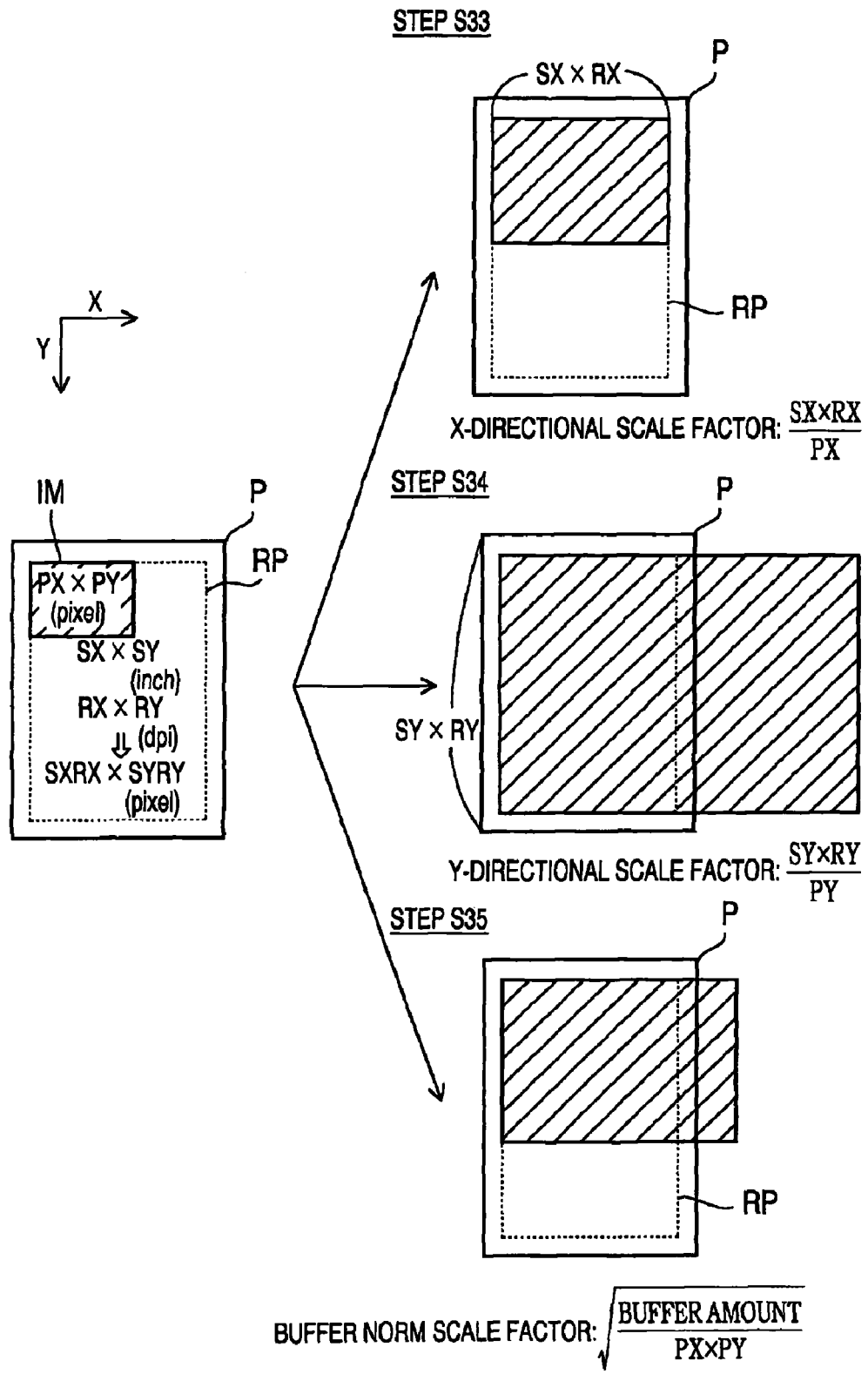
FIG. 9 is a first illustration which shows the scale factor setup routine.
Figure 10:
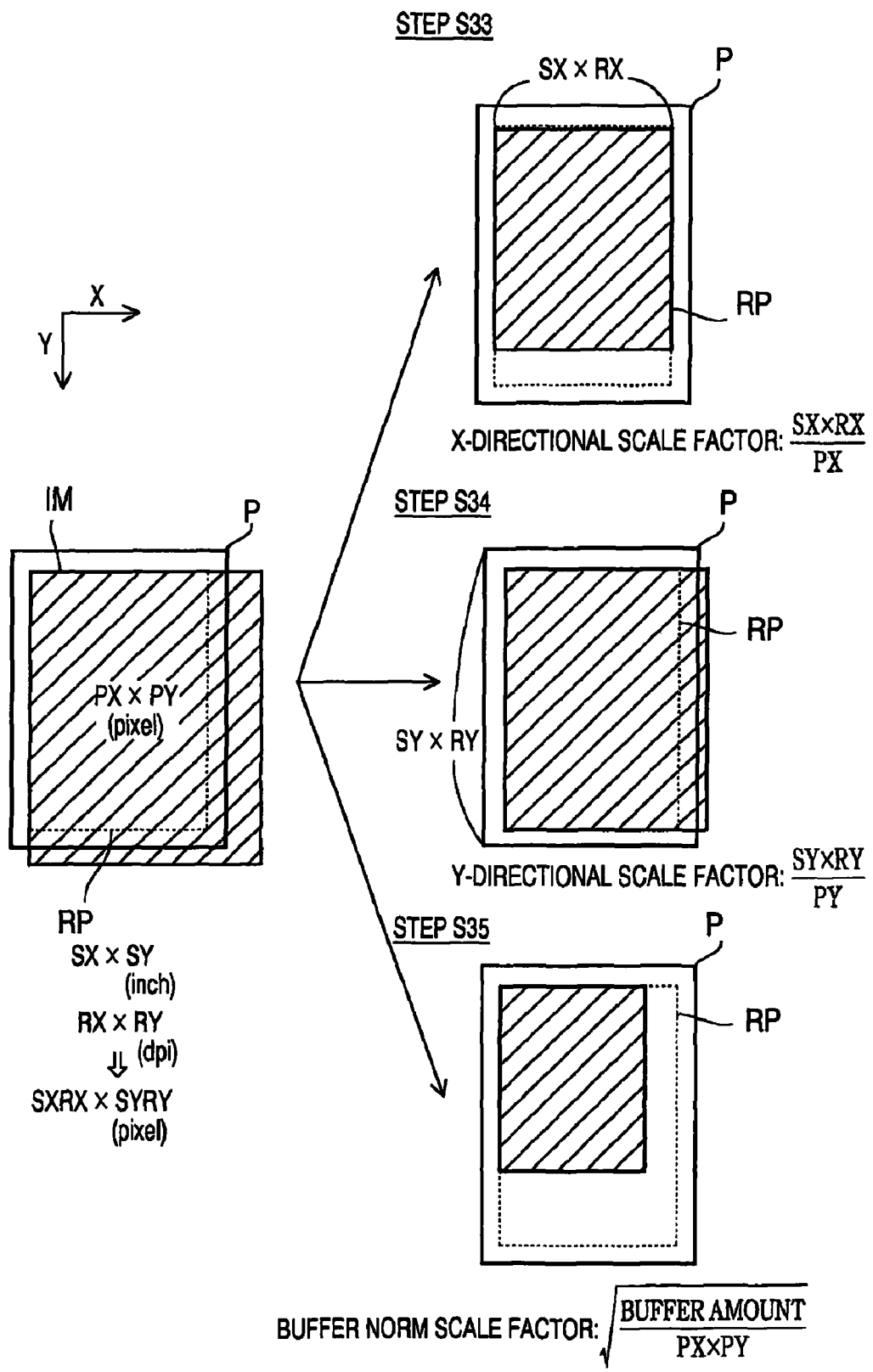
FIG. 10 is a second illustration which shows the scale factor setup routine.

Operations of the multi function device 1 are described. The CPU 101 executes the control program 102P and the multi function device 1 realizes various functions such as a printer function, a scanner function, a copy function, a facsimile function and a mail receiving function. Especially, as can be seen in flowcharts in FIGS. 5-8, the mail receiving function is to check mails periodically and is a function to print the mail on print papers by the printer unit 2 when an electronic mail is received. The function is a facsimile-like function for an electronic mail. If a received electronic mail contains an attached image, a scale factor is determined to effectively fit the attached image (input image data) IM to a recordable area RP of print papers P and an enlarged or reduced image is printed as shown in FIG. 9 and FIG. 10. Hereinafter, the processes are described in detail.

(2-1) Main Routine

Figure 5:
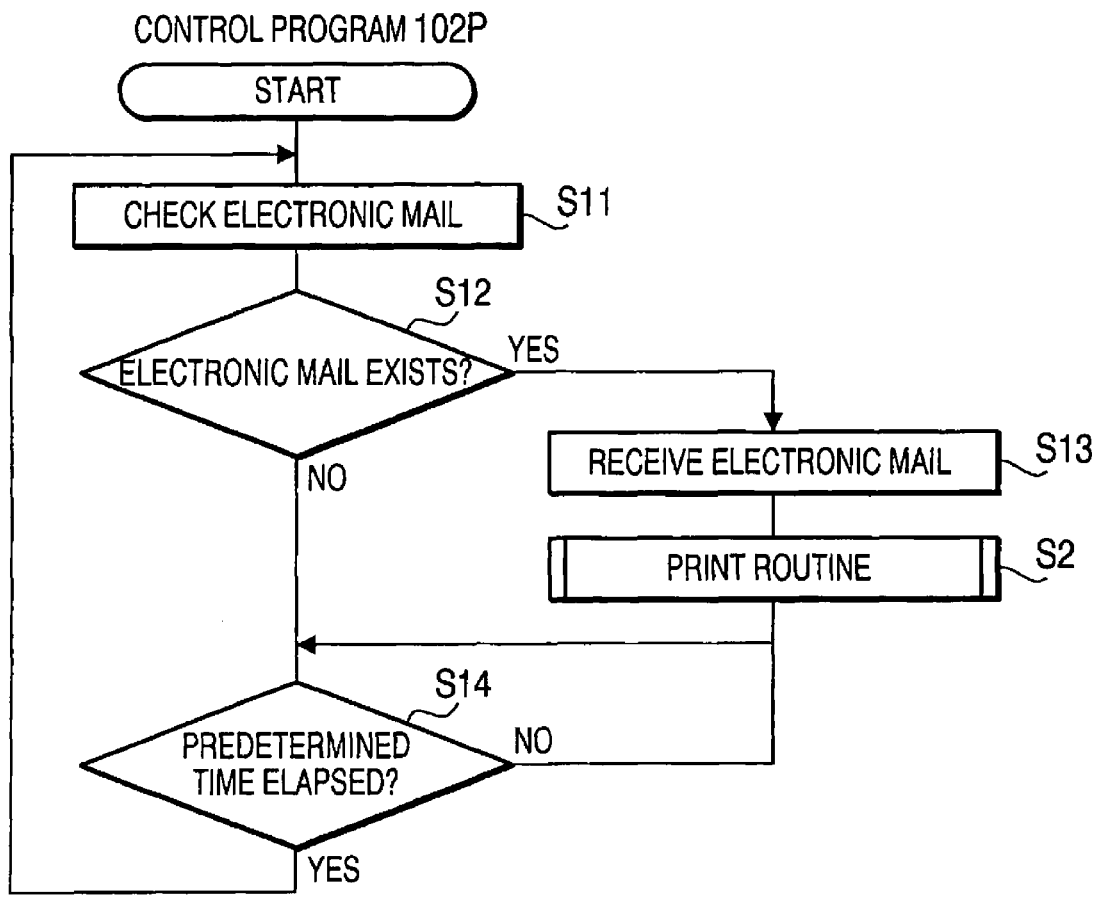
FIG. 5 shows a flowchart of a process executed by a control program.

As a flowchart in FIG. 5 shows, the CPU 101 has a mail receiving function to check a mail server on a LAN or the Internet (POP3 server, etc.) periodically via a LAN Interface 113 (S11-S14). If there exists an electronic mail in the mail server (S12: YES), an electronic mail is received (S13). The received electronic mail is temporarily stored in the mail receiving buffer 103B (storage unit) in the RAM 103, and the received electronic mail is read out in the print routine S2 which is described next. Then the received electronic mail is stored in the flash memory 104.

(2-2) Print Routine

Figure 6:
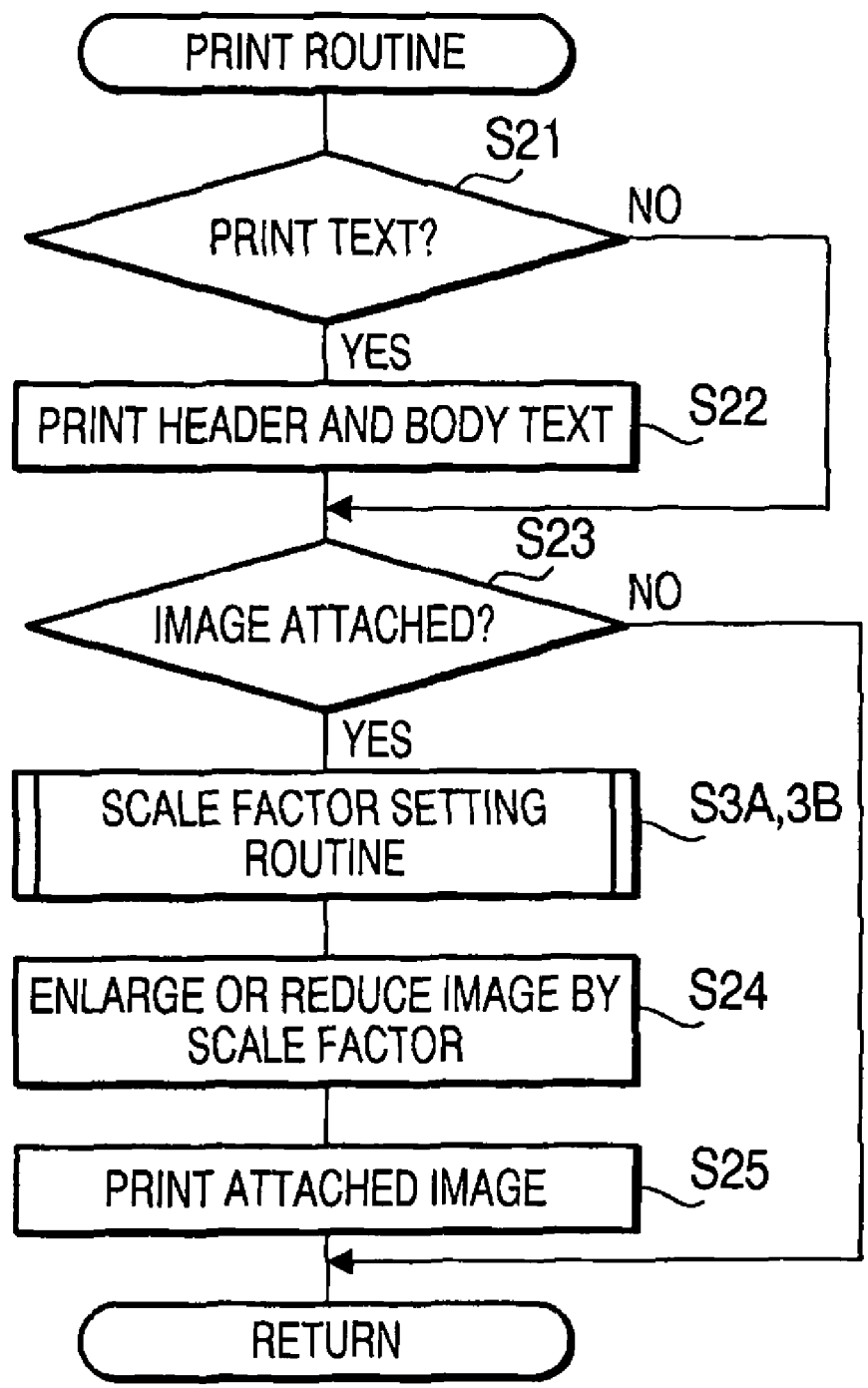
FIG. 6 shows a flowchart of a print routine.
Figure 7:
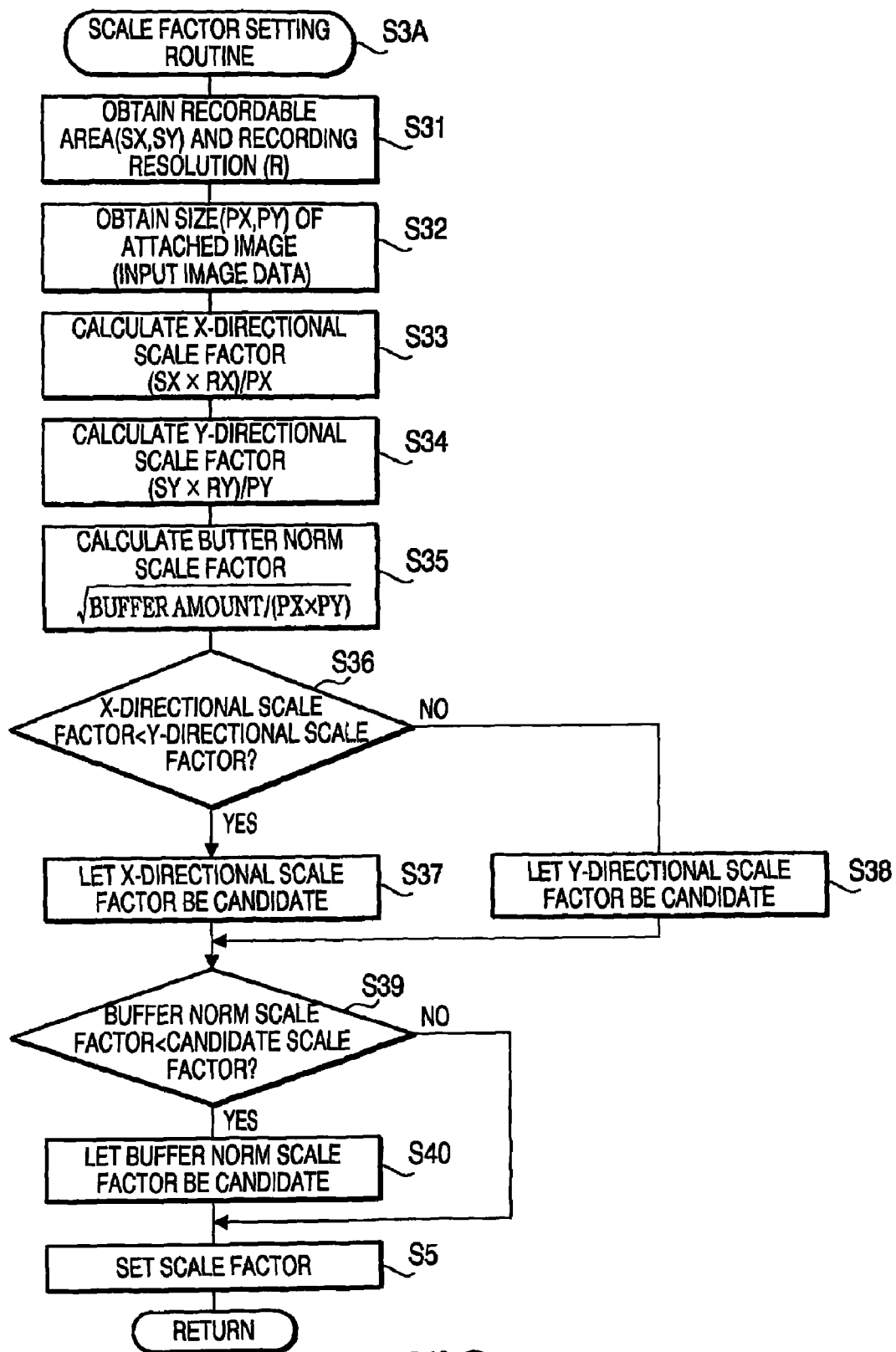
FIG. 7 shows a flowchart of a first example of a scale factor setup routine.

In a print routine S2, as a flowchart in FIG. 6 shows, it is determined whether the current setup is to print text included in the header or the body of the electronic mail (S21). Such a setup can be made using the operation panel 9 preliminarily. Then, if the setup is to print text (S21: YES), text in the header and the body of the electronic mail are printed (S22). If the setup is not to print text (S21: No) or after printing the text (S22), it is determined whether the electronic mail contains an attached image (S23). If the electronic mail contains an attached image (S23: YES), the CPU 101 reads out the attached image as input image data, and generates output image data by transforming the data into image format for printing. Then, the CPU 101 enlarges or reduces the output image data by a scale factor which is setup by a scale factor setup routine S3A or S3B as a function of an image enlarging/reducing unit (S24), stores the output image data in the output buffer 103A, and prints the data on print papers with the printer unit 2 (S25). For example, if the attached image is a JPEG image, the CPU 101 decompresses the image data into bit map data in RGB color model, then transforms the data into bit map data in CMYK color model for printing.

(2-3) Scale Factor Setup Routine

A first example S3A of the scale factor setup routine is described. As a flowchart in FIG. 7 and illustrations in FIGS. 9 and 10 show, firstly, setup values of a range ($S_X \times S_Y$ inch) of recordable area RP of print papers P and recording resolution ($R_X \times R_Y$ dpi) are obtained (S31). These setup values are stored in a non-volatile memory such as a flash memory 104. Herewith, a size of the recordable area RP (pixel size: $S_X R_X \times S_Y R_Y$ pixel) is calculated. Then, a size of the attached image (input image data) IM ($P_X \times P_Y$ pixel) is obtained. It is noted that Y direction is along transport direction of print papers P that is a longitudinal direction of a rectangle of print papers P, and X direction is an orthogonal direction to the Y direction.

Next, as shown in the upper parts of FIGS. 9 and 10, the largest scale factor where an X direction with of the enlarged or reduced image IM does not exceed X direction width ($S_X R_X$ pixel) of the recordable area RP of print papers P is calculated as an X directional scale factor (S33) when the attached image IM ($P_X \times P_Y$ pixel) is enlarged or reduced. Here, a scale factor where an X direction width of the enlarged or reduced attached image IM is equal to an X direction width of the recordable area RP ($S_X R_X$ pixel) is an X directional scale factor. That is $S_X R_X / P_X$. As shown in the middle parts of FIGS. 9 and 10, a Y directional scale factor ($S_Y R_Y / P_Y$) is calculated similarly (S34).

Then, as shown in the lower parts of FIGS. 9 and 10, the largest scale factor where data amount of the output image data does not exceed a memory capacity of the output buffer 103A is determined as a buffer based scale factor (S35) when the attached image IM ($P_X \times P_Y$ pixels) is enlarged or reduced. A buffer amount is defined as the largest number of pixels of an image which can be stored in the output buffer 103A. Then, the buffer based scale factor is $\sqrt{\text{bufferamount}/(P_X \times P_Y)}$. It is noted that the buffer amount is a corresponding value to the number of pixels, and is different from memory capacity of the output buffer 103A (byte). Precisely, if data in CMKY color model is stored in the output buffer 103A, a quarter of the memory capacity of the output buffer 103A (byte) is a memory capacity of image data corresponding to one color, because CMKY color model contains four primary colors. For example, in the case of 1 bit/pixel, a value of memory capacity (byte) of the output buffer 103A divided by 4 (number of primary colors) and multiplied by 8 (bit) is a number of pixels of a image of which data can be stored in the output buffer 103A. The memory capacity output buffer 103A (byte) is setup within a range not exceeding the size of the recordable area RP ($S_X R_X \times S_Y R_Y$ pixel).

Next, the smallest scale factor among the buffer based scale factor, the first directional scale factor and the second directional scale factor which are obtained in the above described ways is determined as the scale factor to be applied (S36-S40 and S5). That is, the first directional scale factor and the second directional scale factor are compared (S36), and a smaller one is defined as a candidate scale factor (S37 or S38). Then, the candidate scale factor and the buffer based scale factor are compared (S39), and a smaller one is defined as a candidate scale factor (S40). After execution of the steps S36-S40, the candidate scale factor is setup as a scale factor to be applied (S5). Thus, the scale factor is setup is set up in this way, and an output image data can be obtained not exceeding the memory capacity of the output buffer 103A. Then the image can be printed within the recordable area RP (S22 and S23 of the print routine S2, see FIG. 6).

A second example S3B of the scale factor setup routine is described. Steps given the same number as in the first example S3A represent similar steps as those in the first example S3A. As shown in FIG. 8, in steps S36-S42, the smallest scale factor among the buffer based scale factor, the first directional scale factor and the second directional scale factor is set up as a scale factor to be applied. Namely, the selected candidate scale factor among the buffer based scale factor, the first directional scale factor and the second directional scale factor, and the predetermined scale factor are compared (S41), and a smaller scale factor is determined to be a candidate scale factor (S42). Finally, the existing candidate scale factor is set up as a scale factor to be applied (S5). For example, the predetermined scale factor may be determined as the largest scale factor where the enlarged image is easily recognized. This can prevent the attached image from being enlarged too much for printing.

It should be noted that the invention needs not be limited to the configurations of the illustrative embodiments described above, and can be modified in various ways without departing the aspects of the invention.

What is claimed is:

1. An image recording device, comprising:
an output buffer configured to temporarily store image data for one page of a recording medium;
an image recording unit configured to record an image on a recording medium in accordance with the image data stored in the output buffer,
a processor configured to execute instructions to cause the image recording device to provide:
an image generating unit configured to generate output image data based on input image data, the output image data representing an enlarged or reduced version of an image represented by the input image, wherein the image generating unit includes:
a first scale factor determining unit configured to determine a first scale factor, the first scale factor being determined such that an amount of the output image data which represents the enlarged or reduced image does not exceed a capacity of the output buffer in the case that the image represented by the input image data is enlarged or reduced by the first scale factor;
a second scale factor determining unit configured to determine a second scale factor based on the size of the image and the size of a recordable area in the recording medium;
a scale factor determining unit configured to determine a scale factor by which the image represented by the input image data is enlarged or reduced, the scale factor being determined to be a smaller one of the first scale factor and the second scale factor; and
an image enlarging/reducing unit that generates the output image data based on the scale factor determined by the scale factor determining unit.

2. The image recording device according to claim 1, further comprising:
a communication unit configured to receive image data via a communication network; and
a storage unit configured to store the received image data, wherein the image generating unit reads out the image data from the storage unit as the input image data and generates the output image data.

3. The image recording device according to claim 1, further comprising:
a communication unit configured to receive an electronic mail from a mail server via a communication network; and
a storage unit configured to store the received electronic mail,
wherein the image generating unit reads out image data attached to the electronic mail from the storage unit as the input image data and generates the output image data.

4. An image recording device, comprising:
an output buffer configured to temporarily store image data for one page of a recording medium;
an image generating unit configured to generate output image data based on input image data, the output image data representing an enlarged or reduced version of an image represented by the input image; and
an image recording unit configured to record an image on a recording medium in accordance with the image data stored in the output buffer,
wherein the image generating unit includes:
a buffer based scale factor determining unit configured to determine a buffer based scale factor, the buffer based scale factor being determined such that an amount of the output image data which represents the enlarged or reduced image does not exceed a capacity of the output buffer in the case that the image represented by the input image data is enlarged or reduced by the buffer based scale factor;
a first directional scale factor determining unit configured to determine a first directional scale factor, the first directional scale factor being determined such that a size of the enlarged or reduced output image data does not exceed a width of a recordable area in the recording medium in a first direction in the case that the image represented by the input image data is enlarged or reduced by the first directional scale factor;
a second directional scale factor determining unit configured to determine a second directional scale factor, the second directional scale factor being determined such that a size of the enlarged or reduced output image data does not exceed a width of a recordable area in the recording medium in a second direction which is orthogonal to the first direction in the case that the image represented by the input image data is enlarged or reduced by the second directional scale factor;

a scale factor comparing unit configured to determine the smallest value among the buffer based scale factor, the first directional scale factor, the second directional scale factor and a predetermined scale factor;

a scale factor determining unit configured to determine a scale factor by which the image represented by the input image data is enlarged or reduced to be the value determined by the scale factor comparing unit; and an image enlarging/reducing unit that generates the output image data based on the scale factor determined by the scale factor determining unit.

5. The image recording device according to claim 4, wherein the scale factor comparing unit compares the first directional scale factor and the second directional scale factor, and then compares the buffer based scale factor with the smaller value between the first directional scale factor and the second directional scale factor.

6. The image recording device according to claim 4, wherein the scale factor comparing unit compares the first directional scale factor and the second directional scale factor, next compares the buffer based scale factor with a smaller value in a first comparison, and then compares the predetermined scale factor with a smaller value in a second comparison.

7. The image recording device according to claim 4, further comprising:
a communication unit configured to receive image data via a communication network; and
a storage unit configured to store the received image data, wherein the image generating unit reads out the image data from the storage unit as the input image data and generates the output image data.

8. The image recording device according to claim 4, further comprising:
a communication unit configured to receive an electronic mail from a mail server via a communication network; and
a storage unit configured to store the received electronic mail,
wherein the image generating unit reads out image data attached to the electronic mail from the storage unit as the input image data and generates the output image data.

9. An image recording device, comprising:
an output buffer configured to temporarily store image data for one page of a recording medium;
an image recording unit configured to record an image on a recording medium in accordance with the image data stored in the output buffer,
a processor configured to execute instructions to cause the image recording device to provide:
an image generating unit configured to generate output image data based on input image data, the output image data representing an enlarged or reduced version of an image represented by the input image, wherein the image generating unit includes:
a buffer based scale factor determining unit configured to determine a buffer based scale factor, the buffer based scale factor being determined such that an amount of the output image data which represents the enlarged or reduced image does not exceed a capacity of the output buffer in the case that the image represented by the input image data is enlarged or reduced by the buffer based scale factor;

a first directional scale factor determining unit configured to determine a first directional scale factor, the first directional scale factor being determined such that a size of the enlarged or reduced output image data does not exceed a width of a recordable area in the recording medium in a first direction in the case that the image represented by the input image data is enlarged or reduced by the first directional scale factor;

a second directional scale factor determining unit configured to determine a second directional scale factor, the second directional scale factor being determined such that a size of the enlarged or reduced output image data does not exceed a width of a recordable area in the recording medium in a second direction which is orthogonal to the first direction in the case that the image represented by the input image data is enlarged or reduced by the second directional scale factor;

a scale factor comparing unit configured to determine the smallest value among the buffer based scale factor, the first directional scale factor, the second directional scale factor and a predetermined scale factor;

a scale factor determining unit configured to determine a scale factor by which the image represented by the input image data is enlarged or reduced to be the value determined by the scale factor comparing unit; and an image enlarging/reducing unit that generates the output image data based on the scale factor determined by the scale factor determining unit.

10. The image recording device according to claim 9, wherein the scale factor comparing unit compares the first directional scale factor and the second directional scale factor, next compares the buffer based scale factor with a smaller value in a first comparison, and then compares the predetermined scale factor with a smaller value in a second comparison.

11. The image recording device according to claim 9, further comprising:
a communication unit configured to receive image data via a communication network; and
a storage unit configured to store the received image data, wherein the image generating unit reads out the image data from the storage unit as the input image data and generates the output image data.

12. The image recording device according to claim 9, further comprising:
a communication unit configured to receive an electronic mail from a mail server via a communication network; and
a storage unit configured to store the received electronic mail,
wherein the image generating unit reads out image data attached to the electronic mail from the storage unit as the input image data and generates the output image data.

* * * * *